Patented Oct. 2, 1934

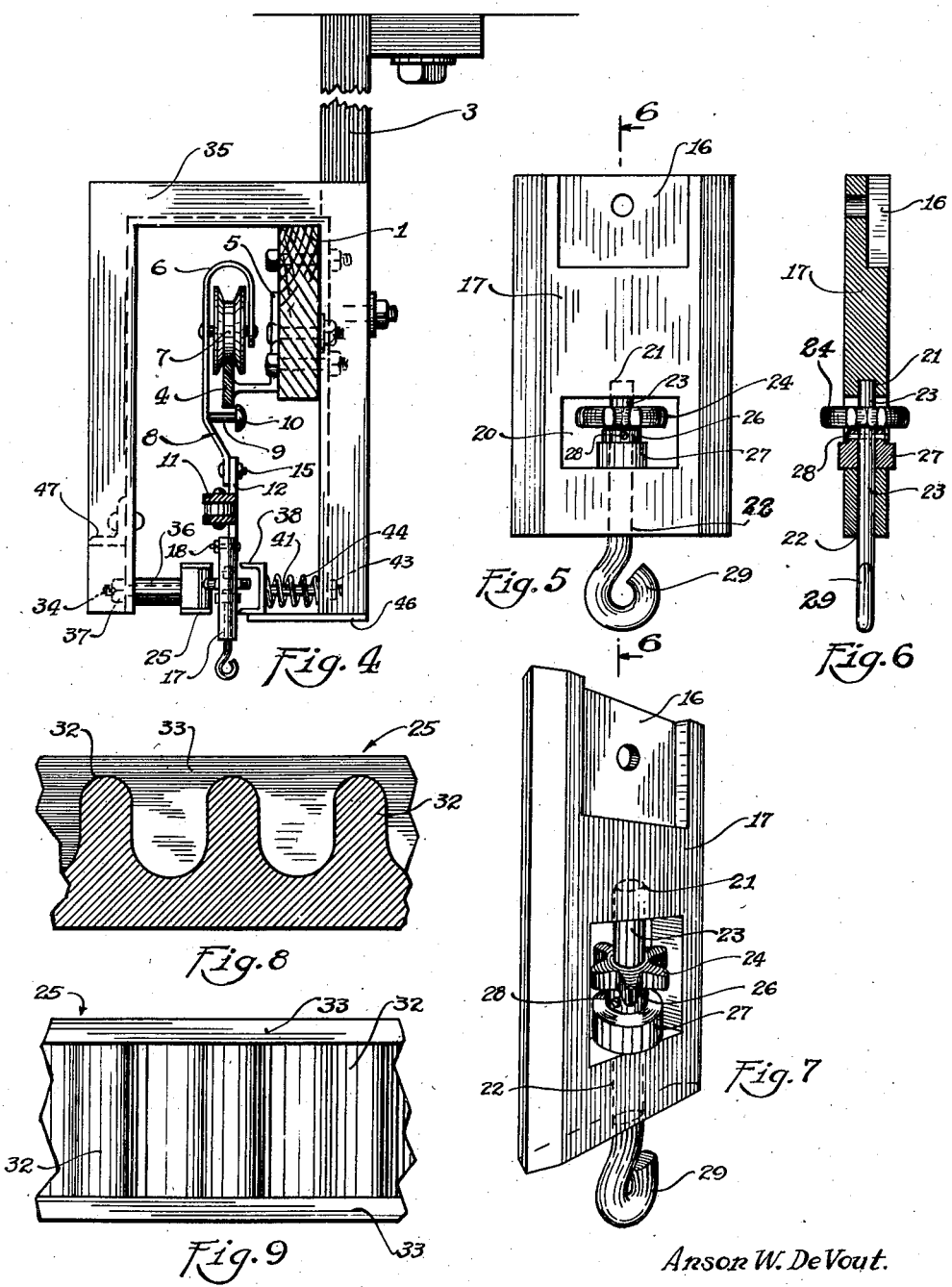

1,975,196

UNITED STATES PATENT OFFICE

1,975,196

SINGEING METHOD AND MEANS

Anson W. De Vout, Chicago, Ill., assignor to Swift and Company, Chicago, Ill., a corporation of Illinois Application January 27, 1932, Serial No. 589,224

13 Claims. (Cl. 17—11)

The invention relates to a poultry singer.

The object of the present invention is to provide a simple, practical and efficient poultry singer of strong, durable and comparatively inexpensive construction adapted to be readily installed adjacent a poultry picking room and capable of enabling poultry to be readily attached to an endless conveyor in a suspended condition and carried by the endless conveyor past singeing burners and automatically turned at the said burners so that all portions of the poultry will be effectively singed by the said burners.

With these and other objects in view, the invention consists in the construction and novel combination and arrangement of parts hereinafter fully described, illustrated in the accompanying drawings, and set forth in the claims hereto appended, it being understood that various changes in the form, proportion and minor details of construction, within the scope of the claims, may be resorted to without departing from the spirit of the invention or sacrificing any of the advantages thereof.

In the drawings:—

Fig. 4 is an enlarged detail transverse sectional view taken substantially on the line 4—4 of Fig. 1.

Fig. 5 is a detail view of the bearing plate or member in which the pinion is mounted for turning the poultry.

Fig. 6 is a transverse sectional view of the same on the line 6—6 of Fig. 5.

Fig. 7 is a detail perspective view of the bearing plate or member.

Fig. 8 is a longitudinal sectional view of a portion of the horizontal rack bar.

Fig. 9 is a detail elevation of a portion of the rack bar.

Figure 1:
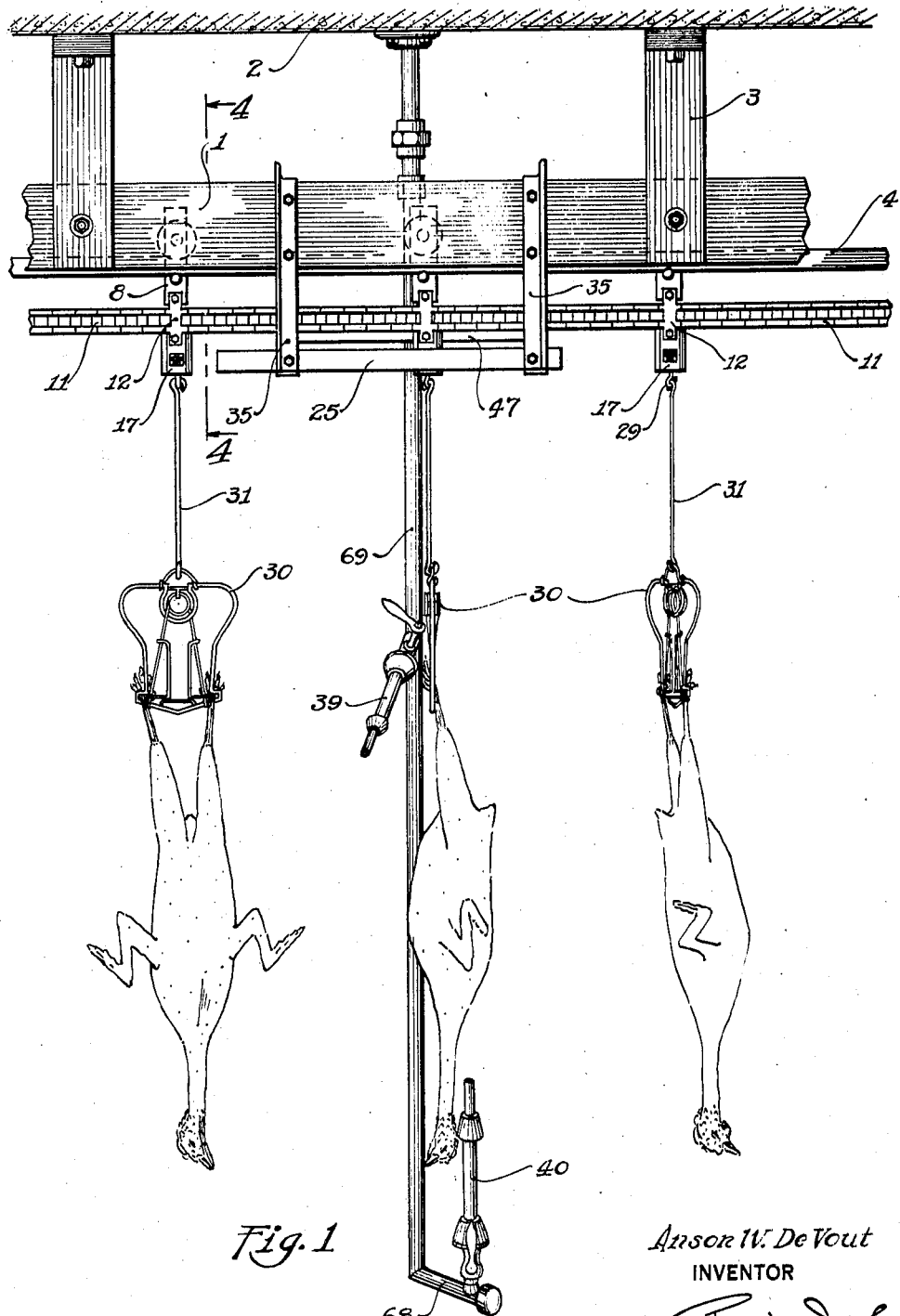
Figure 1 is an elevation of a poultry singer constructed in accordance with this invention.
Figure 2:
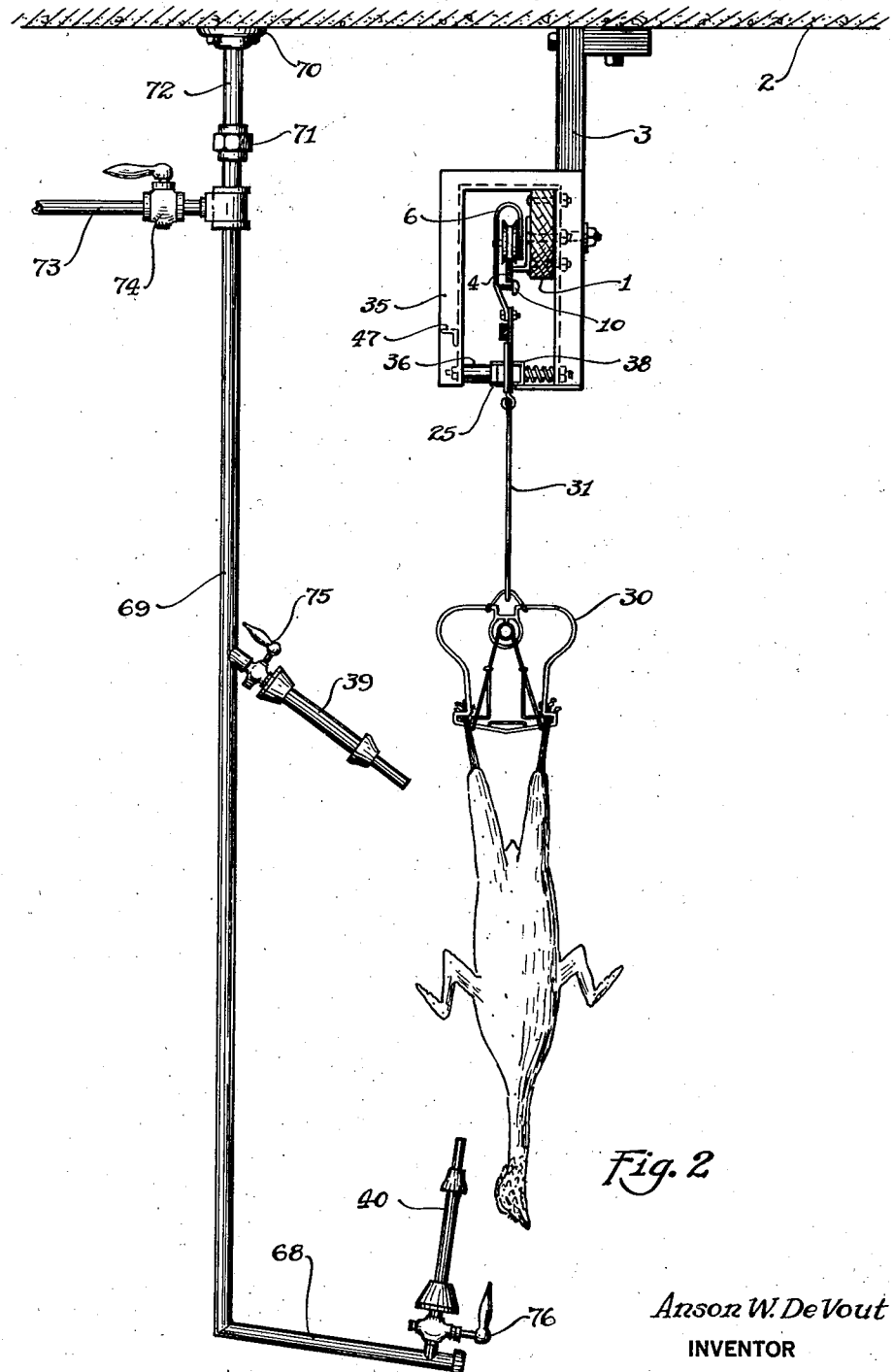
Fig. 2 is a transverse sectional view of the same partly in elevation.

In the accompanying drawings in which are illustrated the preferred embodiment of the invention 1 designates a horizontal rail support consisting preferably of a suitable timber or timbers and arranged in spaced relation with the ceiling 2 of the room in which the singer is installed, and suspended from the ceiling by means of approximately inverted L-shaped hangers 3. The hangers 3, which have upper horizontal portions and depending vertical portions, are bolted to the ceiling and to the rail support 1, as clearly illustrated in Fig. 3 of the drawings. The rail support 1 has mounted on it a horizontal rail 4 arranged in spaced relation with the rail support 1 and provided at the side adjacent the same with approximately L-shaped arms 5 which are suitably secured to one of the side faces of the rail support. The timber constituting the rail support is arranged edgewise vertically and the rail preferably consists of a flat bar arranged edgewise vertically and adapted to receive trolleys consisting of a trolley hook 6 and a grooved trolley wheel 7. The grooved trolley wheel 7 is adapted to run on the upper edge of the rail 4 and the trolley hook extends downwardly at one side of the rail and inwardly beneath the same, its lower supporting portion 8 being located below and in the plane of the rail. The trolley hook is also provided below the rail with a headed stud or pin 9 extending from the trolley hook at a point below the rail from one side thereof to the opposite side of the same and having a head 10 which projects above the plane of the lower edge of the rail so that the rail is confined between the groove of the trolley wheel and the headed stud, whereby the trolley is effectually prevented from leaving the rail.

The trolleys which are arranged at suitable intervals support an endless conveyor chain 11 preferably composed of single and double links and designed to be arranged on suitable sprocket wheels or pulleys (not shown). The double links are provided at intervals with integral vertical plates 12 having upper and lower portions 13 and 14 extending above and below the conveyor chain and arranged at the outer side thereof so as not to interfere with the passing of the chain around the said sprocket wheels. The upwardly extending portion 13 is secured by a bolt 15 to the lower depending portion of the trolley hook and the lower portion 14 of the plate 12 is fitted in a recess 16 formed in the front or outer side face of a bearing plate or member 17. The plate or member 17 constitutes a bearing bracket and the lower portion 14 of the plate 12 of the conveyor chain fits snugly in the said recess 16 and is secured to the bearing plate 17 by a bolt 18 or other suitable fastening device.

The bearing plate 17, which is substantially oblong, is arranged vertically and it is provided at its lower portion with a rectangular opening 20 and it has upper and lower bearings 21 and 22 in the top and bottom walls of the said opening 20 to receive a vertical shaft 23. The bearing 21 consists of a socket in which is fitted the upper end of the shaft 23 which is vertical and the lower bearing 22 extends entirely through the lower portion of the plate 17 to permit the shaft 23 to be passed upwardly through the lower bearing and fitted in the upper bearing. The intermediate portion of the shaft 23 has keyed or otherwise secured to it a pinion 24 located substantially centrally of the opening 20 and adapted to mesh with a horizontal rack or gear bar 25.

The pinion is preferably provided at its lower side with an extended hub or sleeve 26 which is enlarged at the lower portion to form a head 27 and which is secured to the shaft 23 by a key 28 or other suitable fastening device. In assembling the parts the pinion is placed in the opening 20 and the shaft 23 is passed upwardly through the lower bearing opening 22 and through the pinion and sleeve into the upper bearing 21. The key 28 interlocks the pinion with the shaft 23 and retains the shaft in the bearings. The depending portion of the shaft 23 is provided with an eye 29 to which a poultry shackle 30 is connected by a hanger rod 31 or other suitable means.

The horizontal rack bar which is provided with vertical teeth 32 to mesh with the teeth of the pinion may be of any desired construction and it is provided at the top and bottom with flanges 33 extending outwardly beyond the teeth 32, as clearly illustrated in Fig. 8 of the drawings to prevent the gear from becoming disengaged from the rack bar through any vertical movement of the parts. The horizontal rack bar is secured adjacent its ends by bolts 34 or other suitable fastening devices to the inner or rear sides of inverted approximately U-shaped angle iron frames 35. The bolts 34 are extended horizontally from the rack bar 25 and pierce flanges of the angle iron frames 35, spacing sleeves 36 being interposed between the rack bars and the adjacent sides of the frames 35, as clearly shown in Fig. 4 of the drawings. The bolts are provided at their outer threaded ends with nuts 37 by means of which the horizontal rack bars and the spacing sleeves are tightly clamped in position and rigidly secured to the frames 35.

Figure 3:
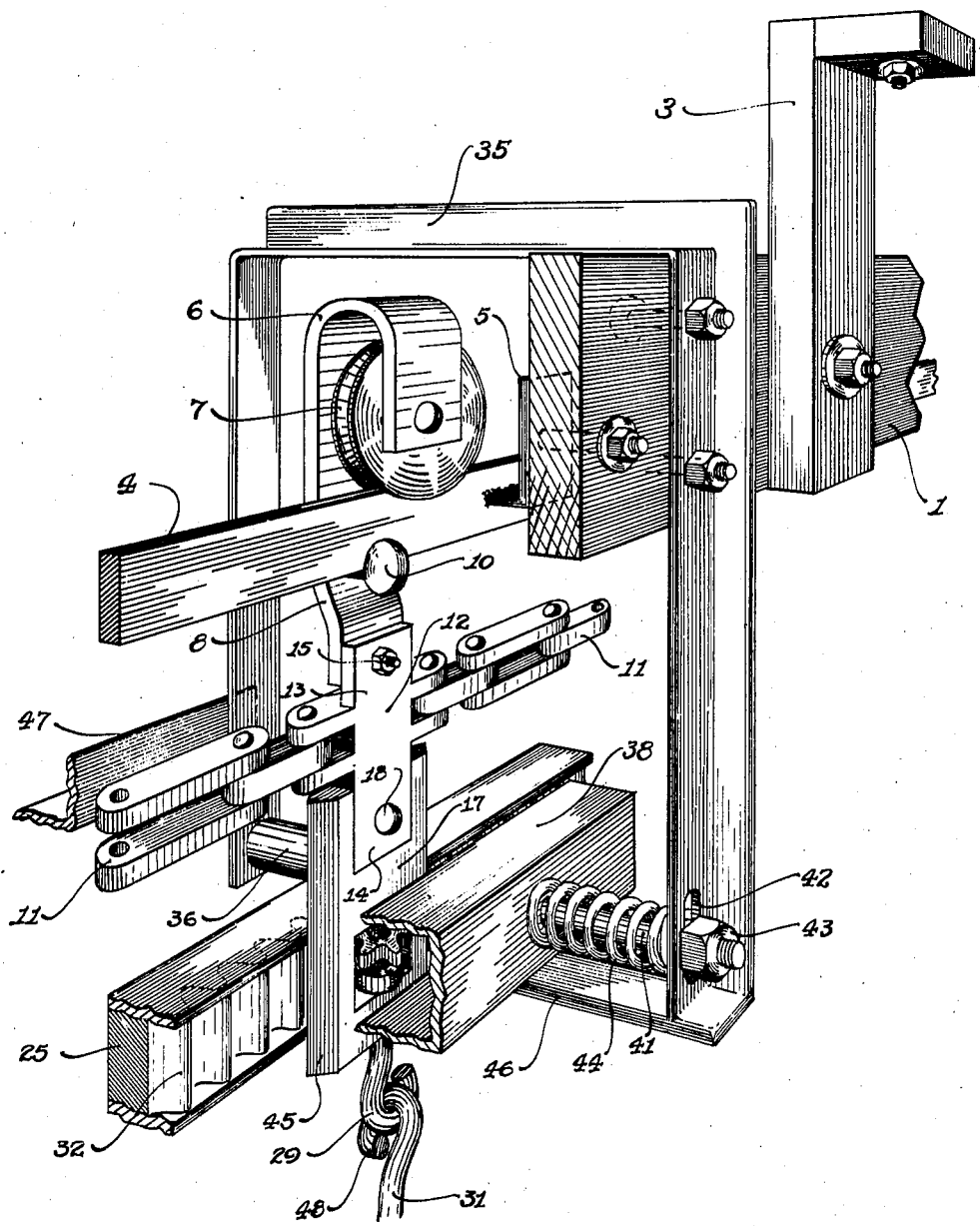
Fig. 3 is an enlarged detail perspective view of a portion of the poultry singer illustrating the manner of mounting the endless conveyor and the gearing for automatically turning or rotating the poultry.

The frames 35 are arranged upon the rail support and extend rearwardly from the same, as clearly illustrated in Fig. 3 of the drawings, and the front sides of the frames 35 are bolted or otherwise secured to the rail support in abutting relation to the same. The front sides of the frames 35 depend below the rail supports and support channel guides 38 which are yieldably mounted and which fit against the bearing plate 17 above and below the pinion and urge the same toward the horizontal rack bar and maintain the pinion in mesh with the said rack bar while the poultry is being carried past and subjected to the singeing action of upper and lower burners 39 and 40. The channel guide 38, which is composed of upper and lower sides and a connecting vertical portion, forms a channel opening towards the horizontal rack bar and it extends substantially the length of the latter and is supported by horizontal rods or bolts 41 rigidly connected at their inner ends to the channel guide 38 and having their outer portions slidably mounted in openings 42 in the lower portions of the front sides of the angle iron frame 35. The outer threaded ends of the bolts or rods 41 are provided with nuts 43 and coiled springs 44 which are disposed on the bolts 41 are interposed between the channel guide and the front sides of the frames 35 for yieldably maintaining the channel guide in abutting relation with the bearing plates 17 passing between the channel guide and the horizontal rack bar. The nuts 43 vary the effective length of the bolts 41 and are adapted to space the channel guides normally from the horizontal rack bars to provide an intervening space to enable the bearing plates 17 to readily pass between the channel guide and the rack bar.

The bearing plates are provided with oppositely beveled front and rear vertical edges 45 to facilitate the passage of the bearing plates through the space between the channel guide and the horizontal rack bar. The chanel guide is slidably supported adjacent its ends by horizontal plates 46 rigidly connected at their outer portions to the lower ends of the front sides of the frames 35 and extending inwardly or rearwardly therefrom to a point beneath the channel guide and forming supporting ledges for the same. The ledges for supporting the channel guide may be formed by separate horizontal plates welded or otherwise secured to the frame, but ledges of any other desired construction may, of course, be provided. The lower portions of the front sides of the angle iron frames are preferably braced by a horizontal angle iron brace 47 secured to the said frames and arranged between outwardly extending flanges therof, as clearly illustrated in Fig. 1 of the drawings.

The poultry shackle 30 suspended from rod 31 is more particularly described and is claimed in the copending application which is a division of this application, entitled improvements in Poultry shackle, filed November 2, 1932, Serial No. 640,767.

The endless conveyor chain may be driven by any suitable means and the trolleys support the conveyor chain and also the means for hanging the poultry and for turning the same. When the bearing plate or bracket 17 is carried to the horizontal rack bar it passes between the same and the channel guide and the pinion 24 meshes with the teeth of the rack bar and rotary motion is communicated to the shaft 23 which causes a turning of the shackle and the poultry as the latter is subjected to the singeing action of the upper and lower burners 39 and 40.

The upper and lower burners 39 and 40 which may be of any desired construction are preferably staggered, as clearly illustrated in Fig. 1 of the drawings so that they will operate on different portions of the poultry and thoroughly singe the same while the poultry is passing through the singeing zone.

The lower burner 40 extends upwardly from a horizontal arm 68 of a vertical gas pipe 69 which is preferably suspended from the ceiling 2 by a floor plate 70. The upper end of the gas pipe 69 is preferably closed by a suitable coupling 71 which is connected by a short pipe 72 to the floor plate 70. The gas pipe 69 is connected at a suitable point preferably slightly below the coupling 71 with a service pipe 73 having a suitable cock or valve 74 for controlling the flow of gas to the gas pipe 69. Also the burners 39 and 40 are provided with suitable controlling valves 75 and 76 to enable the flow of gas to the burners 39 and 40 to be independently controlled.

What is claimed is:—

1. A poultry singer including an endless conveyor provided at intervals with means for suspending poultry therefrom, means located in the path of the poultry for singeing the same, and means for automatically turning the poultry while the same is passing the singeing means, said means comprising a relatively fixed rack bar, a pinion carried into and out of mesh with the rack bar by the conveyor and connected with the poultry suspending means, and a yieldable guide in spaced relationship with the rack bar for maintaining the pinion in proper mesh with the rack bar while the pinion is traveling along said rack bar.

2. A poultry singer including an endless conveyor provided at intervals with means for suspending poultry therefrom, means located in the path of the poultry for singeing the same, and means for automatically turning the poultry while the same is passing the singeing means, said means comprising a relatively fixed rack bar, a pinion carried into and out of mesh with the rack bar by the conveyor and connected with the poultry suspending means, and a yieldably mounted channel guide bar in spaced relationship with the rack bar having its channel opening towards the pinion and arranged to receive the same while the pinion is traveling along the rack bar.

3. A poultry singer including an endless conveyor provided at intervals with means for suspending poultry therefrom, means located in the path of the poultry for singeing the same, and means for automatically turning the poultry while the same is passing the singeing means, said means comprising a relatively fixed rack bar, a pinion carried into and out of mesh with the rack bar by the conveyor and connected with the poultry suspending means, a yieldably mounted channel guide bar having its channel opening towards the pinion and arranged to receive the same while the pinion is traveling along the rack bar, and spaced ledges slidably supporting the channel guide bar.

4. A poultry singer including a rail, a conveyor chain provided with trolleys arranged to run on the said rail, bearing brackets arranged at intervals and carried by the conveyor chain, shafts mounted in the bearing brackets and provided with pinions, a relatively fixed rack bar arranged in the path of the pinions and adapted to mesh with the same for rotating the said shafts, and poultry suspending means connected with the shafts whereby the poultry is turned when the pinions are in mesh with the rack bar.

5. A poultry singer including a rail, a conveyor chain provided with trolleys arranged to run on the said rail, bearing brackets carried by and depending from the said chain, vertical shafts mounted in the bearing bracket and provided with pinions, a horizontal rack bar arranged in the path of the pinions and adapted to rotate the shafts when the pinions are in mesh with the rack bar, and means depending from the vertical shafts for suspending poultry therefrom for turning the poultry when the pinions are in mesh with the rack bar, and singeing means arranged to operate on the poultry while the same is being rotated.

6. A poultry singer including a rail, a conveyor chain located beneath the rail and provided at intervals with portions projecting upwardly and downwardly from the chain, trolleys secured to the upwardly projecting portions and arranged on the said rail, bearing plates secured to the downwardly projecting portions of the chain, vertical shafts mounted in the bearing plates and provided with pinions, a rack bar arranged in the path of the pinions and adapted to mesh with the same for rotating the said shafts, and poultry suspending means connected with the said shafts, whereby the poultry is turned when the pinions are in mesh with the rack bar.

7. A poultry singer including a rail, a conveyor chain located beneath the rail and provided at intervals with portions projecting upwardly and downwardly from the chain, trolleys secured to the upwardly projecting portions and arranged on the said rail, bearing plates secured to the downwardly projecting portions of the chain, vertical shafts mounted in the bearing plates and provided with pinions, a rack bar arranged in the path of the pinions and adapted to mesh with the same for rotating the said shafts, poultry suspending means connected with the said shafts, whereby the poultry is turned when the pinions are in mesh with the rack bar, and a yieldably mounted guide extending along the rack bar in spaced relation with the same and arranged to engage the bearing plates for maintaining the pinions in mesh with the rack bar.

8. A poultry singer including a rail, a conveyor chain located beneath the rail and provided at intervals with portions projecting upwardly and downwardly from the chain, trolleys secured to the upwardly projecting portions and arranged on the said rail, bearing plates secured to the downwardly projecting portions of the said chain and provided in their lower portions with openings, vertical shafts extending across the openings and journaled in the bearing plates, pinions arranged in the openings of the bearing plates and mounted on the said shafts, poultry suspending means connected with the said shafts, and a fixed horizontal rack bar arranged in the path of the pinions and adapted to mesh with the same for rotating the shafts to turn the poultry.

9. A poultry singer including a rail, a conveyor chain located beneath the rail and provided at intervals with portions projecting upwardly and downwardly from the chain, trolleys secured to the upwardly projecting portions and arranged on the said rail, bearing plates secured to the downwardly projecting portions of the said chain and provided in their lower portions with openings, vertical shafts extending across the openings and journaled in the bearing plates, pinions arranged in the openings of the bearing plates and mounted on the said shafts, poultry suspending means connected with the said shafts, a fixed horizontal rack bar arranged in the path of the pinions and adapted to mesh with the same for rotating the shafts to turn the poultry, a guide bar extending along the rack bar and arranged to permit the bearing plates to pass between the rack bar and the said guide bar, means for slidably mounting the guide bar, and springs for yieldably maintaining the guide bar in engagement with the bearing plates.

10. A poultry singer including a rail, a conveyor chain located beneath the rail and provided at intervals with portions projecting upwardly and downwardly from the chain, trolleys secured to the upwardly projecting portions and arranged on the said rail, bearing plates secured to the downwardly projecting portions of the said chain and provided in their lower portions with openings, vertical shafts extending across the openings and journaled in the bearing plates, pinions arranged in the openings of the bearing plates and mounted on the said shafts, poultry suspending means connected with the said shafts, a fixed horizontal rack bar arranged in the path of the pinions and adapted to mesh with the same for rotating the shafts to turn the poultry, a guide bar extending along the rack bar and arranged to permit the bearing plates to pass between the rack bar and the said guide bar, means for slidably mounting the guide bar, and springs for yieldably maintaining the guide bar in engagement with the bearing plates, said bearing plates having beveled edges to permit them to readily pass between the rack bar and the guide bar.

11. A poultry singer including a rail, a conveyor chain having trolleys arranged to run on the rail, bearing members depending from the conveyor chain, shafts mounted in the bearing members and provided with pinions, a horizontal rack bar located at one side of the bearing plates and arranged to mesh with the pinions for rotating the said shafts, a guide bar located at the opposite side of the said bearing plates, an approximately inverted U-shaped frame extending over the said rail and depending at opposite sides of the same and the conveyor chain, fixed means carried by one side of the said frame for rigidly supporting the rack bar, and yieldable means carried by the other side of the said frame for supporting the guide bar and for maintaining the latter in engagement with the bearing plates to hold the pinions in mesh with the rack bars.

12. A poultry singer including a horizontal rail support, hangers for mounting the rail support, a rail carried by the said support in spaced relation with the same, a conveyor chain located below the rail and having trolleys arranged to run thereon, spaced approximately inverted U-shaped frames secured to the rail support and extending over the rail and having downwardly extending sides located at opposite sides of the rail and the said chain, bearing members depending from the chain at intervals, shafts mounted on the bearing members and provided with pinions, a horizontal rack bar located between the sides of the frames and rigidly supported by the same in the path of the pinions for rotating the said shafts, and a horizontal guide bar located at the opposite side of the bearing members and yieldably supported by the said frames for engaging the bearing members to maintain the pinions in mesh with the rack bar.

13. The method of singeing a poultry carcass which consists in first removing the feathers, suspending the poultry carcass from an overhead conveyor and then subjecting the carcass to the action of a fixed flame by causing the carcass to pass through the flame rotatably.

ANSON W. DE VOUT.